United States Patent
Price

(10) Patent No.: US 11,222,418 B2
(45) Date of Patent: Jan. 11, 2022

(54) SYSTEM AND METHOD FOR AUTOMATED SURFACE ASSESSMENT

(71) Applicant: Palo Alto Research Center Incorporated, Palo Alto, CA (US)

(72) Inventor: Robert R. Price, Palo Alto, CA (US)

(73) Assignee: Palo Alto Research Center Incorporated

( * ) Notice: Subject to any disclaimer, the term of this patent is extended or adjusted under 35 U.S.C. 154(b) by 326 days.

(21) Appl. No.: 16/522,510

(22) Filed: Jul. 25, 2019

(65) Prior Publication Data

US 2021/0027442 A1 Jan. 28, 2021

(51) Int. Cl.
| | | |
|---|---|---|
| *G06T 7/00* | (2017.01) | |
| *G06T 7/50* | (2017.01) | |
| *G06N 20/20* | (2019.01) | |
| *G06N 3/04* | (2006.01) | |
| *G06N 3/08* | (2006.01) | |
| *G06T 5/50* | (2006.01) | |

(52) U.S. Cl.
CPC .......... *G06T 7/001* (2013.01); *G06N 3/0454* (2013.01); *G06N 3/08* (2013.01); *G06N 20/20* (2019.01); *G06T 5/50* (2013.01); *G06T 7/50* (2017.01); *G06T 2207/20081* (2013.01); *G06T 2207/20084* (2013.01); *G06T 2207/20224* (2013.01)

(58) Field of Classification Search
CPC ................................ A61B 5/1073; G06N 3/04
See application file for complete search history.

(56) References Cited

PUBLICATIONS

Zhao Zhixuan et al.,: "A Surface Detect Detection Method Based on Positive Samples", Jul. 27, 2018, Big Data Analytics in the Social and Ubiquitous Context; 5th International Workshop on Modeling Social Media, MSM 2014, 5th International Workshop on Mining Ubiquitous and Social-Environments, Muse 2014 and First International Workshop on Machine LE, XP047481215. *abstract; figure 2*, *section 3*.

Komoto Kyosuke et al., "A performance evaluation of detect detection by using Denoising AutoEncoder Generative Adversarial Networks", 2018 International Workshop on Advanced Image Technology (IWAIT), IEEE, Jan. 7, 2018, pp. 1-4, XP033352573. *abstract; figures 4,5* *section V*.

Zhu Jun-Yan et al.: "Unpaired Image-to-Image Translation Using Cycle-Consistent Adversarial Networks", 2017 IEEE International Conference on Computer Vision (ICCV), IEEE, Oct. 22, 2017, pp. 2242-2251, XP033283087. *the whole document*.

*Primary Examiner* — Edward Park

(74) *Attorney, Agent, or Firm* — Shun Yao; Park, Vaughan, Fleming & Dowler

(57) ABSTRACT

Embodiments described herein provide a system for assessing the surface of an object for detecting contamination or other defects. During operation, the system obtains an input image indicating the contamination on the object and generates a synthetic image using an artificial intelligence (AI) model based on the input image. The synthetic image can indicate the object without the contamination. The system then determines a difference between the input image and the synthetic image to identify an image area corresponding to the contamination. Subsequently, the system generates a contamination map of the contamination by highlighting the image area based on one or more image enhancement operations.

18 Claims, 10 Drawing Sheets

SYSTEM AND METHOD FOR AUTOMATED SURFACE ASSESSMENT

BACKGROUND

Field

This disclosure is generally related to the field of artificial intelligence (AI). More specifically, this disclosure is related to a system and method for automatically assessing the condition of the surface of a device.

Related Art

The exponential growth of device usage has lead to significant device turnovers. Upon a turnover, a device is typically refurbished and/or decontaminated for a resell. Automated visual inspection, which can be used for determining the defects on a surface, can be used to automatically triage incoming devices, provide guidance for automated cleaning systems, or provide quality control on remanufacturing processes. One common approach is to capture an image of a surface of a product and compute features on patches of the image. A classifier can then be used to label the patch as "normal" or "defective." These techniques are suitable for inspecting continuous sheet materials with repeated textures. However, such techniques may not capture the defects of devices with complex geometry and multiple materials.

The printed circuit board inspection industry has developed techniques that work with complex surfaces. Printed circuit board (PCB) inspection may use images with complex, detailed and fully specified structures based on pixel matching techniques and design files. Such techniques can detect excess solder and problems with solder fillet volume and shape, as well as detecting missing or incorrect components, components in the wrong orientation, and bent leads. However, these inspection systems require complete and detailed specification of the product and work only for planar circuit boards that do not have complex geometry that may create shadows and occlusions.

Neural network methods can be trained to classify objects that are difficult to formally specify, such as automatic grading of bananas or detection of defects in thermal fuses. Deep convolutional neural networks (CNN), which can be applied to images without prior feature extraction, have been used to detect subtle damage of blood vessel network in images of eyes caused by diabetic retinopathy. CNNs have also been used to detect dirt, scratches, and burrs in manufacturing processes. However, CNN methods have required a lot of labeled training data to reach sufficient accuracy for production. As a result, a CNN-based technique can be limited to specific problems and may not provide a generic solution.

While existing AI based solutions bring many desirable features to automatic contamination detection, some issues remain unsolved for efficient assessment of non-uniform surfaces.

SUMMARY

Embodiments described herein provide a system for assessing the surface of an object for detecting contamination or other defects. During operation, the system obtains an input image indicating the contamination on the object and generates a synthetic image using an artificial intelligence (AI) model based on the input image. The synthetic image can indicate the object without the contamination. The system then determines a difference between the input image and the synthetic image to identify an image area corresponding to the contamination. Subsequently, the system generates a contamination map of the contamination by highlighting the image area based on one or more image enhancement operations.

In a variation on this embodiment, the AI model includes a cycle-consistent generative adversarial network (CC-GAN).

In a variation, the CC-GAN is trained with two sets of image samples. The a first of the two sets of image samples can include images of the object with contamination and a second of the two sets of image samples can include images of the object without contamination. Furthermore, the contamination indicated in the input image can be absent in the two sets of image samples.

In a variation on this embodiment, the difference between the input image and the synthetic image is a pixel difference in one or more of: a Red-Green-Blue (RGB) space; a hue, saturation, lightness (HSL) space; and a hue, saturation, value (HSV) space.

In a variation on this embodiment, the image enhancement operations include one or more of: dilation, smoothing, thresholding, and a set of operations associated with a deep segmentation network.

In a variation on this embodiment, the system determines depth information associated with the input image and incorporates the depth information with the contamination map to generate an enhanced contamination map.

In a further variation, the system generates a set of trajectories of a decontamination appliance based on the enhanced contamination map. A respective trajectory can cover contamination location on the object at a depth corresponding to the trajectory.

In a further variation, the system incorporates the depth information by determining a mesh representing the geometry of the object based on the depth information and projecting contamination regions indicated in the contamination map onto corresponding locations in the mesh.

In a variation on this embodiment, the system generates a set of contamination maps for the object. A respective contamination map can indicate a viewpoint of the object. This allows the system to solicit multiple views of the object so that the object may be inspected and/or cleaned from all sides.

In a variation on this embodiment, the system generates the contamination map by excluding a background of the input image and non-contaminated elements of the object.

BRIEF DESCRIPTION OF THE FIGURES

In the figures, like reference numerals refer to the same figure elements.

DETAILED DESCRIPTION

Figure 1:
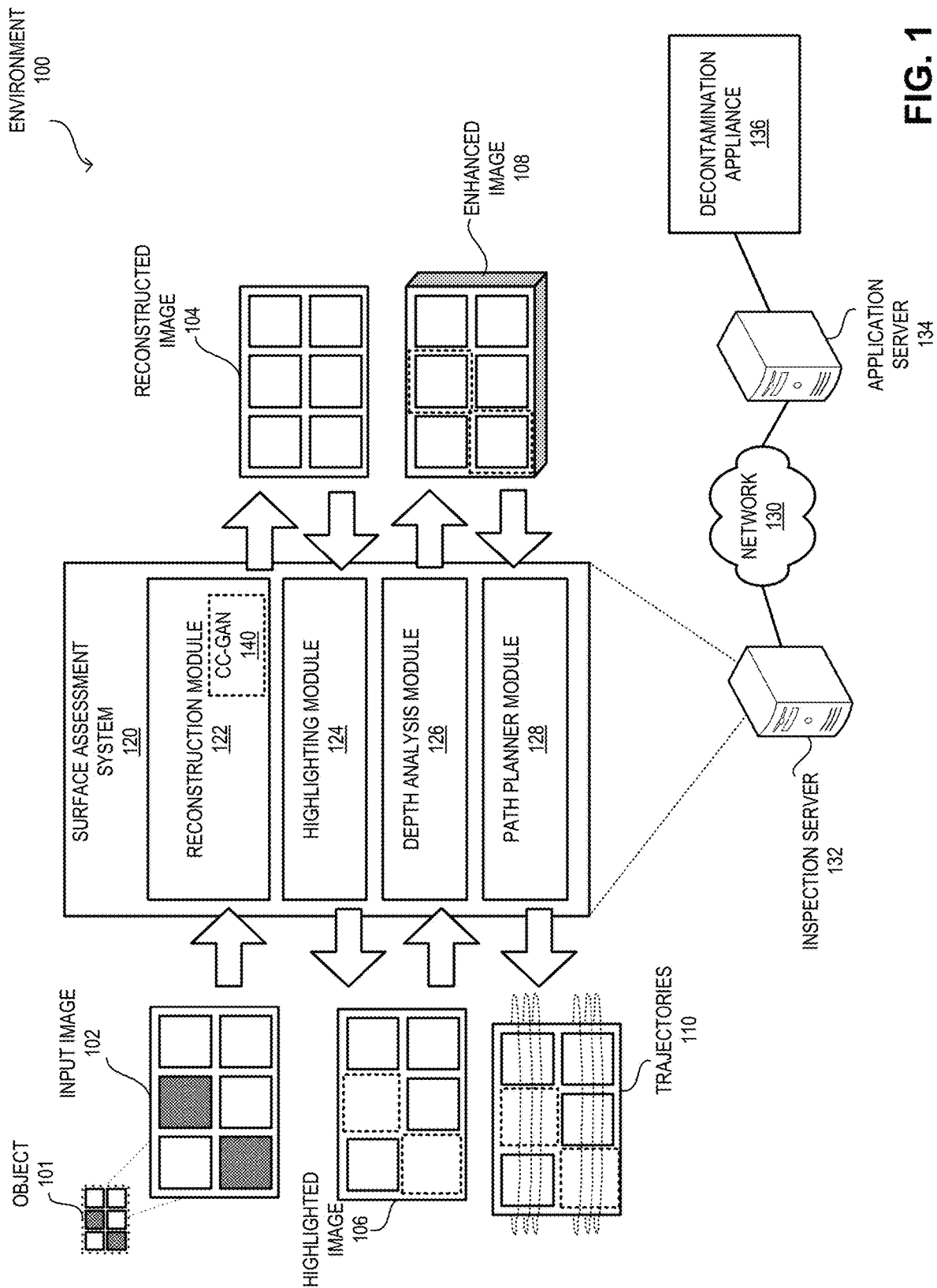
FIG. 1 illustrates an exemplary surface assessment system, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of facilitating surface assessment of an object in unconstrained viewpoints and variable lighting conditions by (i) automatically synthesizing an aligned reference (e.g., a clear version) of an image of the object from a camera image, and highlighting contaminations or other defects on the image; and (ii) generating one or more trajectories based on geometric and depth information of the object.

The existing technologies are not well-equipped to facilitate inspection and decontamination of complex electromechanical systems. To automate the decontamination process for an object, the automation process needs a detailed map of the locations and the types of contamination on the object. Such requirements can be challenging for objects with irregular shapes, noisy surface textures, variations in lighting, and object occlusion. Furthermore, all possible variations in contamination color, thickness, and adhesion may not be known to the decontamination system. In addition, the decontamination system also needs to distinguish between permanent defects, such as scratches, and removable contamination. Frequently, detailed models of the object with realistically rendered surfaces are not available. As a result, a product-specific or a contamination-specific system cannot provide a solution that can support the variation associated with the objects and the contaminations.

To solve these problems, embodiments described herein provide a surface assessment system that efficiently and accurately maps a large variation of contaminations on objects in unconstrained poses and variable lighting conditions. The system can be trained directly on images of the objects and does not need matched pairs of reference views and contamination views. The system can use a deep cycle-consistent generative adversarial network (CC-GAN) to highlight contaminations that take different forms and appear on different backgrounds. GANs have become popular for generating synthetic data, such as synthetic but realistic images. To do so, a GAN typically includes a generator neural network (which is referred to as a generator) and a discriminator neural network (which is referred to as a discriminator).

A CC-GAN is a specific class of GAN that can generate a class of images based on another class of images. In other words, a CC-GAN can synthesize objects in a target class from an instance of another class when the classes share significant gross structure. The generator of the CC-GAN may produce an image sample based on an input image. The generator can try to improve the quality of the image sample by "convincing" the discriminator that the generated image belongs to the target class. The discriminator is tasked with determining whether the generated image sample belongs to the target class. As a result, through multiple iterations, the generator learns to generate an image that incorporates the statistical properties of an image of the target class.

During operation, to detect contamination on an object, the system synthesizes a clean (e.g., without contamination) image from an image of a contaminated object. The system then compares the original image with the synthetic image to assess the surface of the object and locate the contamination. In this way, the system can detect contamination on complex objects with irregular shapes, occlusions, shadows, and distracting surface textures. To generate the synthetic image, the system can use CC-GAN on the original image of the contaminated object. The CC-GAN then generates a synthetic image that depicts the object without the contamination (i.e., an image belonging to the target class). Since the synthetic image depicts a reconstruction of the object, the synthetic image can be referred to as a reconstructed image.

The system can then apply a pixel difference operation between the reconstructed image and the original image. In some embodiments, the system determines the pixel difference based on one or more of: the corresponding Red-Green-Blue (RGB) values; hue, saturation, lightness (HSL) representations; and hue, saturation, value (HSV) representations. For example, if the reconstructed image and the original image are based on hyper-spectral imagery, the visual channels can be more than RGB values or can be a hyper-spectral channel (e.g., ultra violet). Furthermore, other imaging methods, such as x-ray, could be used with the system. The system then applies dilation, smoothing, and thresholding to the resultant difference. This process highlights the contamination on the image of the object, thereby creating a contamination map for the object. The system can also use deep segmentation networks for identifying the contaminated regions. The dialation operators also smooth out noisy maps to create more coherent regions. Since the system generates this contamination map from the reconstructed image of the object, the contamination map can overlook the background of the object in the image, and exclude the uncontaminated elements of the object. The synthesized image can match the pose, illumination, configuration options, and non-functional defects indicated in the original image.

A key feature of this technique is that the system does not need to be trained with matched pairs featuring identical objects showing clean and contaminated conditions in the same pose. It would be difficult to prepare exactly matching examples of contaminated and uncontaminated parts under the same pose and lighting for every possible form of contamination. Instead, the system can be trained with one set of clean or reference images and a second set images of some contaminated objects, which can be different objects in different poses.

Based on the CC-GAN, the system can provide increased generalization relative to methods that rely on pre-specified models. If the system is trained with the images of one object, the trained system can assess the surface of another object with minor variations from the object used for training. For example, if the system is trained to assess the surface of a printer to detect contamination, the system can detect contamination on a printer of another model that belongs to the same series as the printer used for training. This simplifies the data collection and labeling process for training the system.

Exemplary System

FIG. 1 illustrates an exemplary surface assessment system, in accordance with an embodiment of the present application. In this example, an environment 100 includes an application server 134, which can control the decontamination operations of a decontamination appliance 136. Decontamination appliance 136 can be any appliance capable of removing contaminations from an object. For example, decontamination appliance 136 can include a closed environment within which a decontamination agent (e.g., hydrogen peroxide vapor (HPV), carbon dioxide, ice-blasting) is applied to the object. An inspection server 132 of environment 100 can facilitate surface inspection, and provide the result of the inspection to application server 134. In some embodiments, inspection server 132 communicates with application server 134 via a network 130, which can be a local or a wide area network.

With existing technologies, inspection server 132 may not be well-equipped to facilitate inspection and decontamination of complex electromechanical systems. To automate the decontamination process for an object 101, application server 134 needs a detailed map of the locations and types of contamination to be removed. Such requirements can be challenging if object 101 has an irregular shape, noisy surface textures, and/or self-occluding geometry. Furthermore, all possible variations in contamination color, thickness, and adhesion may not be known to application server 134. Furthermore, application server 134 needs to distinguish between permanent defects, such as scratches, and removable contamination. As a result, if inspection server 132 can only provide a product-specific or a contamination-specific detection of contamination, application server 134 cannot provide a solution that can support the variation associated with object 101 and the contaminations on it.

To solve these problems, a surface assessment system 120 can efficiently and accurately map a large variation of contaminations on object 101 in unconstrained poses and variable lighting conditions. System 120 can include a reconstruction module 122, a highlighting module 124, and a depth analysis module 126. During operation, to detect contamination on object 101, reconstruction module 122 synthesize a clean (e.g., without contamination) image from an input image 102 of object 101. Since the synthetic image depicts a reconstruction of object 101, the synthetic image can be referred to as reconstructed image 104. To generate reconstructed image 104, reconstruction module 122 can use a CC-GAN 140 on input image 102. CC-GAN 140 then generates reconstructed image 104 that depicts object 101 without the contamination.

Highlighting module 124 then compares input image 102 with reconstructed image 104 to assess the surface of object 101. Highlighting module 124 can apply a pixel difference operation between reconstructed image 104 and input image 102. In some embodiments, highlighting module 124 determines the pixel difference in one or more of: an RGB space, an HSL space, and an HSV space. Highlighting module 124 then applies dilation, smoothing, and thresholding to the resultant difference. Based on one or more of these operations, highlighting module 124 generates a highlighted image 106 that highlights the contamination on the image of object 101. Highlighting module 124 can also use deep segmentation networks for identifying the contaminated regions on the image of object 101. In this way, highlighted image 106 can be a contamination map for object 101. Since this contamination map of highlighted image 106 is created from reconstructed image 104, the contamination map in highlighted image 106 can exclude the background of object 101 in input image 102 and the uncontaminated elements of object 101. In this way, system 120 can detect contamination on complex objects, such as object 101, which may have one or more of: irregular shapes, occlusions, shadows, and distracting surface textures.

If highlighted image 106 is a two-dimensional (2D) image, the 2D contamination map in highlighted image 106 may provide guidance for decontamination of relatively flat components, such as panels, of object 101. However, for components with depth, decontamination appliance 136 needs to incorporate the depth information to ensure that the cleaning paths follow the geometry of object 101. System 120 can provide the depth information to application server 134 by projecting the contamination regions indicated in highlighted image 106 onto locations in the 3D geometry of object 101. In some embodiments, system 120 can obtain depth information (e.g., the geometric properties) of object 101 along with input image 102.

The depth information may be obtained from an imaging device (e.g., a depth camera) that can provide both the appearance of object 101 on an image and a depth estimate for each pixel of the image. Examples of the imaging device include, but are not limited to, a stereo camera, a light detection and ranging (LIDAR) device, and an infrared emitter. If the image and the depth information are captured separately, depth analysis module 126 can align the depth points with separately captured visual pixels. In some embodiments, depth analysis module 126 determines a mesh representing the geometry of object 101 based on the depth information. The mesh provides a simplified representation of the pointcloud produced by devices such as LIDAR.

Depth analysis module 126 can then determine the surface normal for object 101 and project contamination pixels identified in highlighted image 106 onto the mesh. The determined surface normal can be a vector perpendicular to the surface of object 101 at a given point of the contamination. Depth analysis module 126 can color the points or mesh triangles to indicate the location of the contamination. By incorporating the depth information with highlighted image 106, depth analysis module 126 can generate an enhanced image 108, thereby generating an enhanced contamination map that incorporates the depth information. In some embodiments, system 120 can also include a path planner module 128 that generates the trajectories of the decontamination operation executed by decontamination appliance 136.

For example, if the decontamination process includes spraying decontamination agent on object 101 via a nozzle, decontamination appliance 136 needs to maintain the nozzle distance and angle required for effective cleaning based on the depth information of object 101. Based on enhanced image 108, path planner module 128 can generate a set of trajectories 110 for the nozzle of decontamination appliance 136. This allows the nozzle to follow the geometric shape of object 101. It should be noted that path planner module 128 can also reside on application server 134 and be a component of the controller of decontamination appliance 136.

Surface Assessment System

Figure 2:
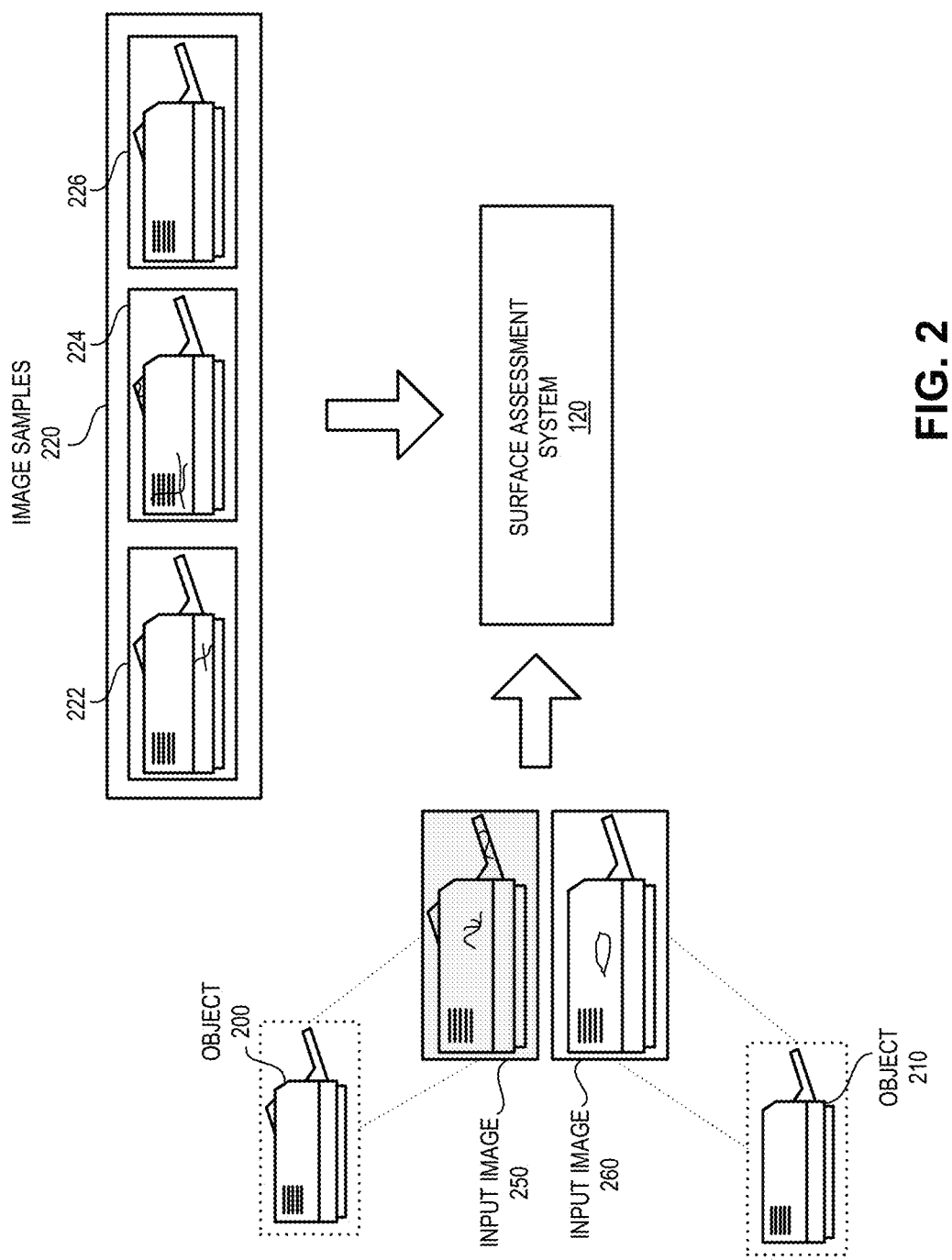
FIG. 2 illustrates an exemplary generic surface assessment for previously unknown contaminations, in accordance with an embodiment of the present application.

FIG. 2 illustrates an exemplary generic surface assessment for previously unknown contaminations, in accordance with an embodiment of the present application. A key capability of system 120 is to be able to efficiently and accurately map a large variation of contaminations on objects in unconstrained poses and variable lighting conditions. In other words, system 120 does not need to be trained with matched pairs featuring identical objects showing in clean and contaminated conditions in the same pose. System 120 can be trained with image samples 220, which can include images of some contaminated objects and corresponding images of similar clean objects in similar poses. In this example, image samples 220 can include images 222 and 224 depicting contaminations on object 200 and an image 226 depicting a clean object 200.

Based on the training, system 120 can detect a different type of contamination or on a different component of object 200 other than the contaminations and contaminated components depicted in images 222 and 224. System 120 can further detect contamination on object 200 in a different lighting condition and/or pose. In this example, input image 250 depicts object 200 in a different lighting condition that were not depicted in image samples 220. Based on the training, system 120 can detect and highlight the contaminations depicted in input image 250.

Even though system 120 is trained with image samples 220 of object 200, system 120 can assess the surface of another object 210 with minor variations from object 200. For example, if object 200 is a printer and system 120 is trained to assess the surface of object 200 to detect contamination, system 120 can detect contamination on another object 210, which can be a printer of another model that belongs to the same series as object 200. As a result, system 120 can detect contamination from input image 260 of object 210 even when image samples 220 may not include an image depicting contamination on object 210. It should be noted that input image 260 can depict object 210 with contaminations that were not depicted in image samples 220. This simplifies the data collection and labeling process for training system 120.

Figure 3A:
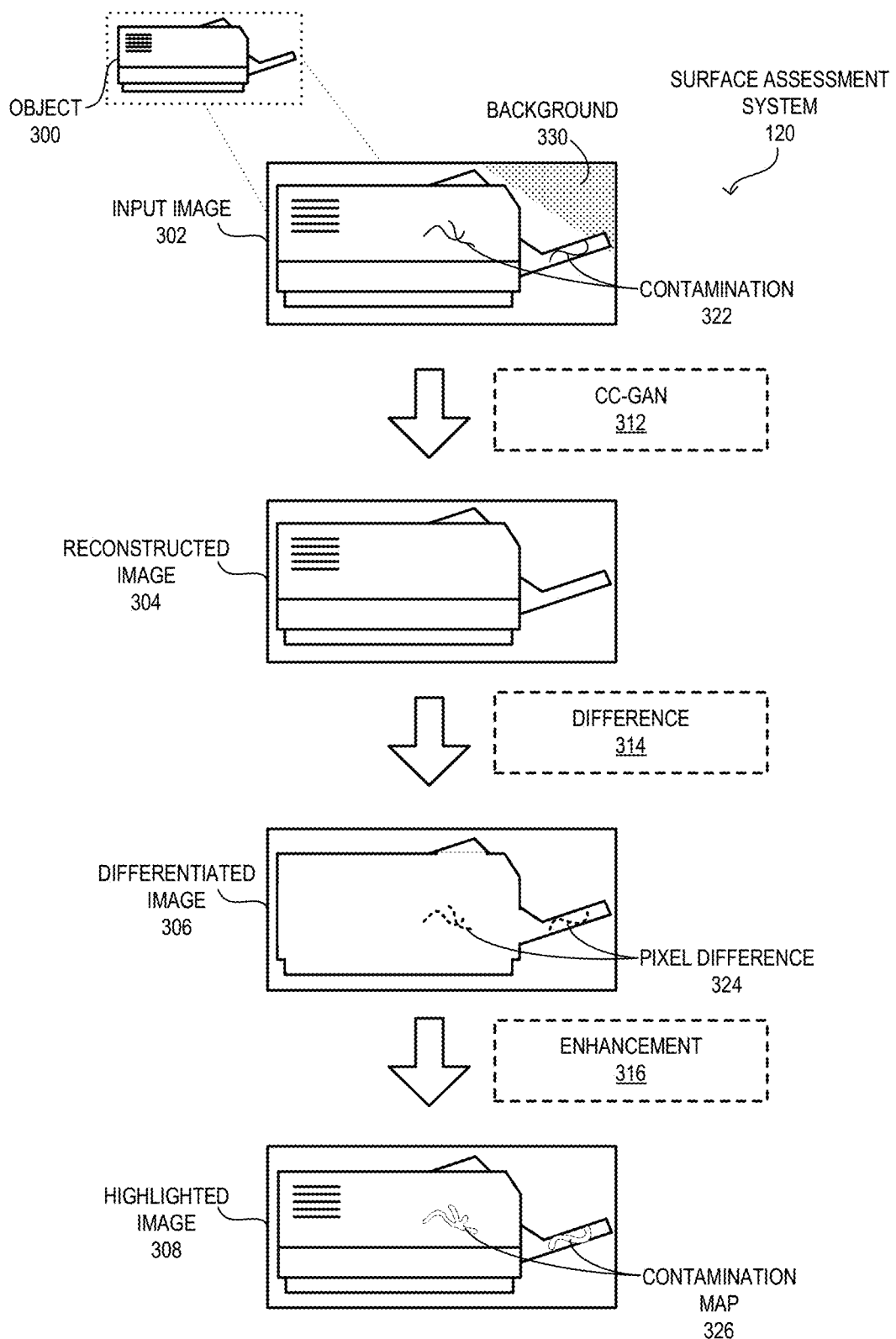
FIG. 3A illustrates an exemplary generation of an image highlighting contaminations on the surface of an object, in accordance with an embodiment of the present application.

FIG. 3A illustrates an exemplary generation of an image highlighting contaminations on the surface of an object, in accordance with an embodiment of the present application. During operation, system 120 detects the pixels that indicate contamination 322 on object 300 in an input image 302 of object 300. System 120 then synthesize a clean (e.g., without contamination) image from input image 302. To generate this synthetic image, system 120 can use a CC-GAN 312 on input image 302 to generate reconstructed image 304 that depicts object 300 without contamination 322.

System 120 then compares input image 302 with reconstructed image 304 to assess the surface of object 300. System 120 can apply a pixel difference operation 314 between reconstructed image 304 and input image 302. System 120 can determine difference operation 314 in one or more of: an RGB space, an HSL space, and an HSV space. Difference operation 314 then generates a differentiated image 306 that depicts pixel difference 324 between reconstructed image 304 and input image 302. System 120 then applies one or more enhancement operations 316 (e.g., dilation, smoothing, thresholding, etc.) to pixel difference 324.

For example, the dilation operation can gradually enlarge the boundaries of regions of pixel difference 324. The dilation operation allows the pixels on pixel difference 324 to grow in size, causing the gaps in pixel difference 324 to become smaller. If pixel difference 324 includes rough or jagged edges, the smoothing operation can ease the rough edges to look more smooth and continuous. For thresholding, system 120 can compare a respective pixel of differentiated image 306 with one or more thresholds. If system 120 determines that the pixel's intensity is less than the thresholds, system 120 can set the pixel to the pixel color of the background. Since the pixels on pixel difference 324 may have a higher value compared to other pixels of differentiated image 306, the thresholding operation can enhance the pixels on pixel difference 324. This operation can also exclude other pixels by setting those pixels to the pixel color of the background.

Based on enhancement operations 316, system 120 generates a highlighted image 308 that highlights contamination 322 on object 300. In this way, highlighted image 308 can represent a contamination map 326 for object 300. Since contamination map 326 of highlighted image 306 is created from reconstructed image 304, contamination map 326 in highlighted image 308 can exclude the background 330 of object 300 in input image 302. Similarly, contamination map 326 can also exclude uncontaminated elements of object 300. In this way, system 120 can detect contamination on complex objects, such as object 300, which may have one or more of: irregular shapes, occlusions, shadows, and distracting surface textures.

Figure 3B:
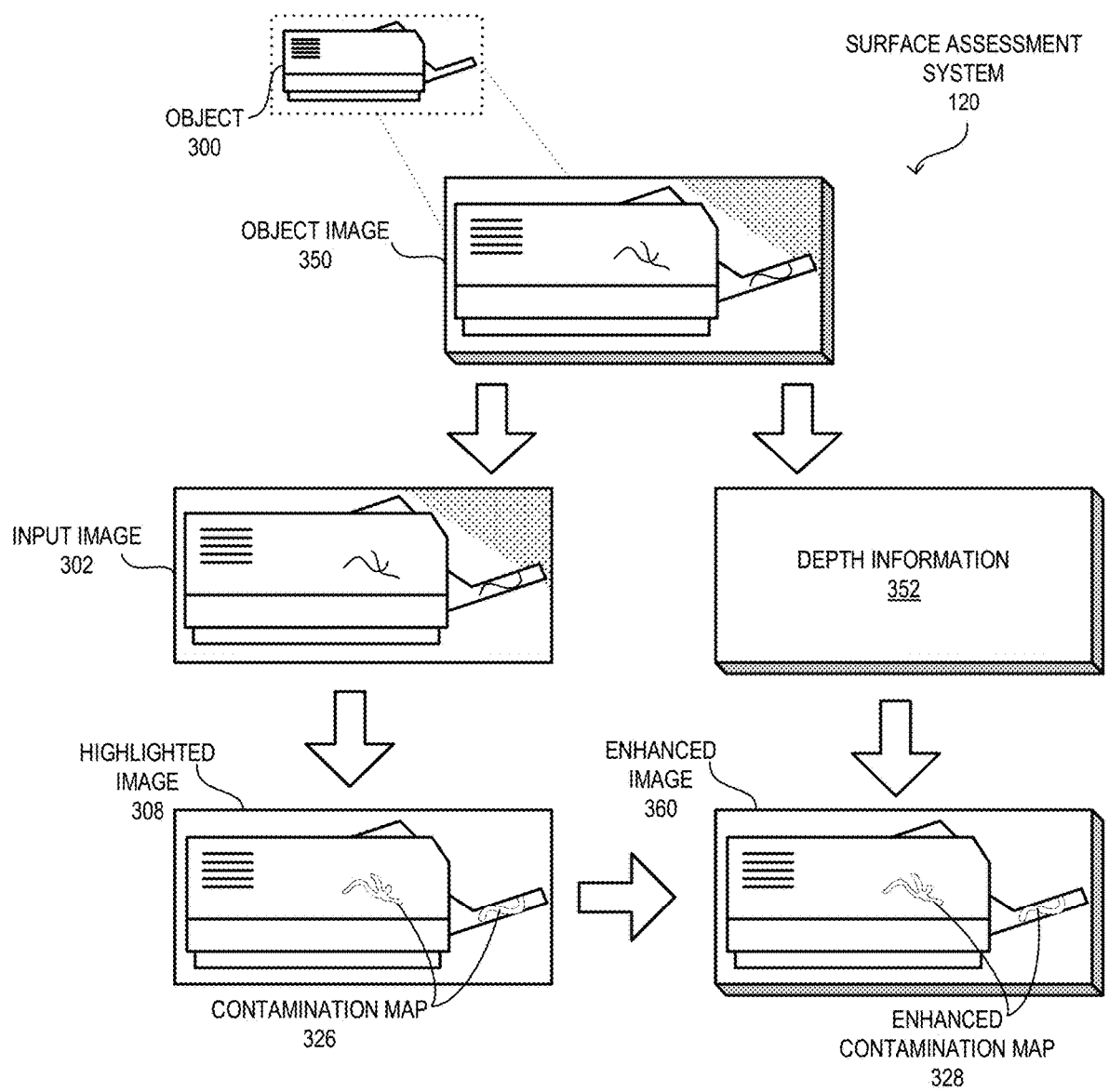
FIG. 3B illustrates an exemplary generation of an enhanced contamination map for a decontamination appliance based on the depth information of an object, in accordance with an embodiment of the present application.

If highlighted image 306 is a two-dimensional (2D) image, contamination map 326 can be a 2D contamination map. Consequently, contamination map 326 may provide guidance for decontamination of relatively flat components, such as panels, of object 300. However, for components with depth, system 120 needs to incorporate the depth information to ensure that the decontamination process can follow the geometry of object 300. FIG. 3B illustrates an exemplary generation of an enhanced contamination map for a decontamination appliance based on the depth information of an object, in accordance with an embodiment of the present application. System 120 can incorporate the depth information by projecting the contamination regions indicated in highlighted image 308 onto locations in the 3D geometry of object 300.

During operation, system 120 can obtain depth information 352 (e.g., the geometric properties) of object 300 along with input image 302. System 120 may obtain depth information 352 from an object image 350 captured and/or generated by an imaging device (e.g., a depth camera). Examples of the imaging device include, but are not limited to, a stereo camera, a LIDAR device, and an infrared emitter. Object image 350 can include both the appearance of object 300 on an image and a depth estimate for each pixel of the image. System 120 can split the image and the depth estimate to generate input image 302 and depth information 352, respectively. In some embodiments, input image 302 and depth information 352 are captured separately. System 120 can then align the depth points with separately captured visual pixels of input image 302.

Upon generating highlighted image 308, system 120 can combine a respective pixel (or a set of pixels) and the depth estimate for that pixel (or the set of pixels). Based on the combining operation, system 120 can generate an enhanced image 360 that includes both contamination map 326 and the depth information associated with the pixels of contamination map 326. In this way, enhanced image 360 can represent an enhanced contamination map 328 that includes depth information of a respective pixel (or a group of pixels). In some embodiments, system 120 can determine a mesh representing the geometry of object 300 based on depth information 352. System 120 then determines the surface normal for object 300 and project contamination pixels identified in contamination map 326 onto the mesh. System 120 can color the points or mesh triangles to indicate the location of the contamination.

Figure 4:
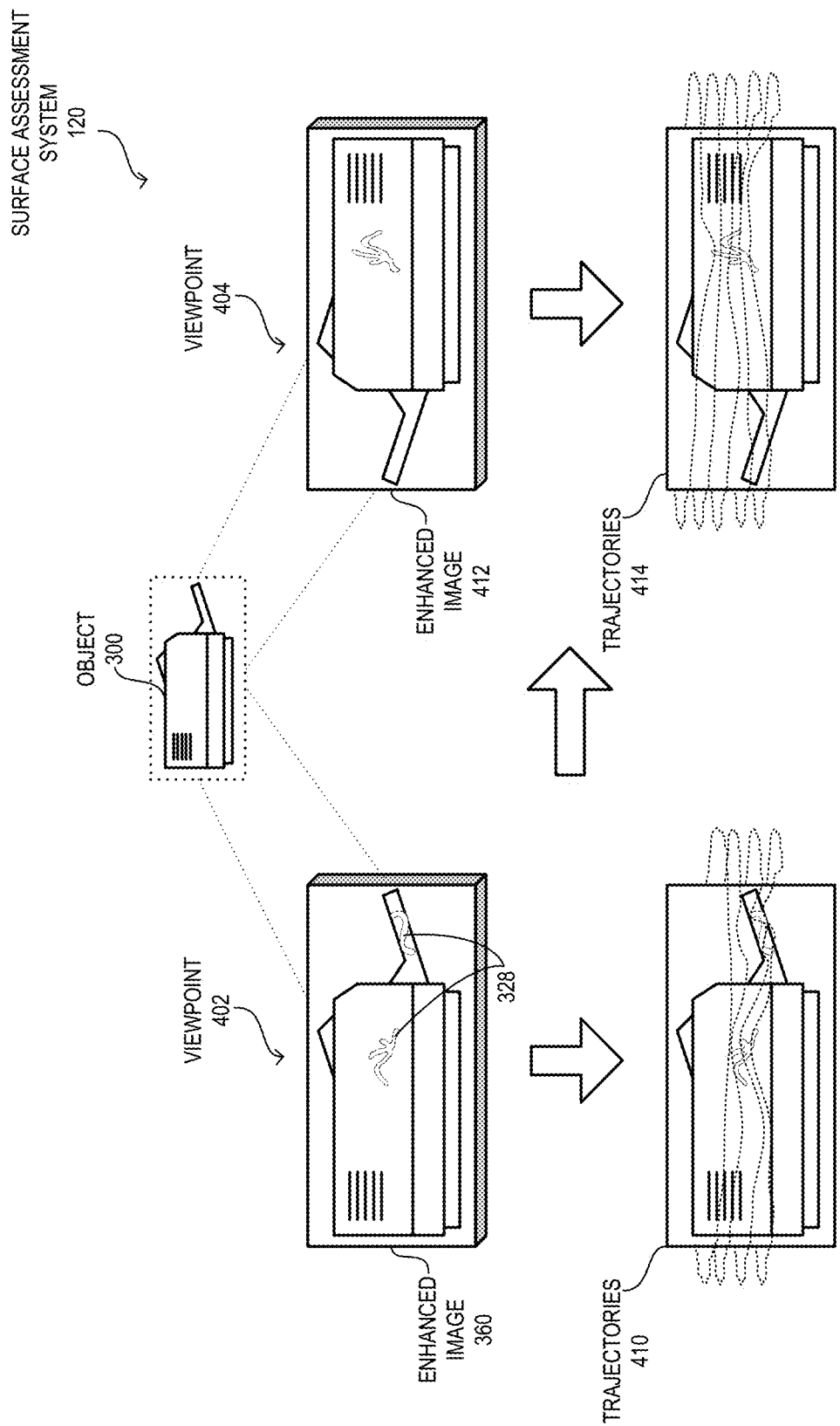
FIG. 4 illustrates an exemplary generation of trajectories for a decontamination appliance based on the depth information of an object from different viewpoints, in accordance with an embodiment of the present application.

In some embodiments, system 120 can also operate as a path planner that generates the trajectories of the decontamination operation. FIG. 4 illustrates an exemplary generation of trajectories for a decontamination appliance based on the depth information of an object from different viewpoints, in accordance with an embodiment of the present application. If the decontamination process includes spraying decontamination agent on object 300 via a nozzle, the decontamination appliance needs to maintain the nozzle distance and angle required for effective cleaning based on the depth information of object 300. Based on enhanced image 360 and enhanced contamination map 328, system 120 can generate a set of trajectories 410 for the nozzle so that the nozzle can follow the geometric shape of object 300. Each of trajectories 410 can cover the contamination location on object 300 at a depth corresponding to the trajectory.

If object 300 includes components with complex protrusions or cavities, system 120 may need to change viewpoints of object 300 to map contamination accurately. For example, enhances image 360 can represent a viewpoint 402 of object 300. Therefore, trajectories 410 can facilitate the decontamination from viewpoint 402. However, a different viewpoint 404 of object 300 can indicate a different set of contaminations. As a result, system 120 can generate another enhanced image 412 that represents viewpoint 404, as described in conjunction with FIG. 3A. Based on enhanced image 412, system 120 can generate a set of trajectories 414, as described in conjunction with FIG. 3B. Trajectories 414 can facilitate the decontamination from viewpoint 404. In this way, system 120 can facilitate extensive decontamination from different viewpoints for an object.

It should be noted that a user may provide object images and/or input images corresponding to different viewpoints of an object. In some embodiments, system 120 can also include a camera controlling mechanism that automatically aligns a depth camera (or any other image device) to different viewpoints of the object to obtain the corresponding object images. System 120 can maintain a predefined set of viewpoints for the camera controlling mechanism. If the differentiated image of a viewpoint does not indicate any contamination, system 120 may discontinue further processing for that viewpoint.

Operations

Figure 5A:
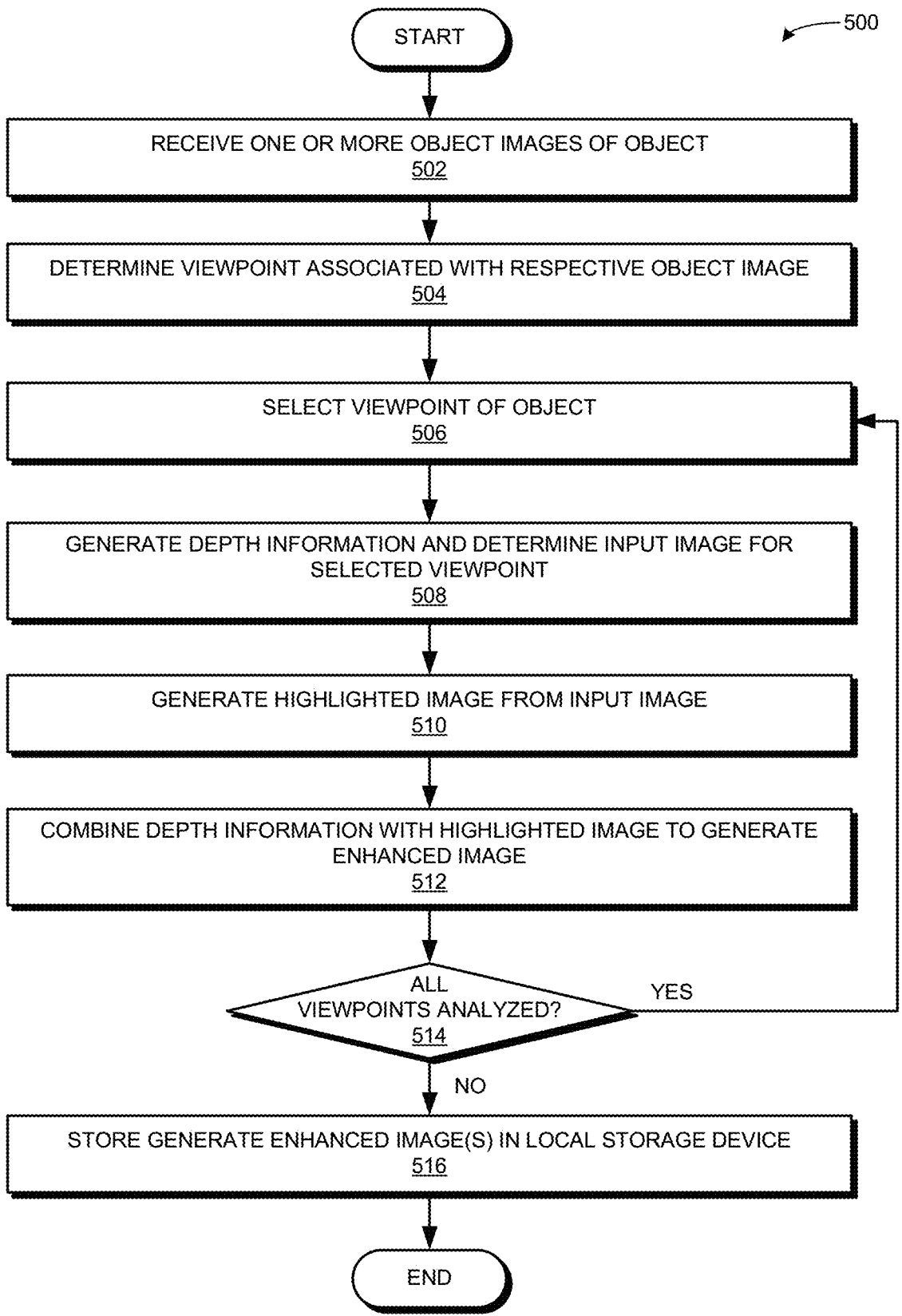
FIG. 5A presents a flowchart illustrating a method of a surface assessment system generating depth-enhanced images that highlight contaminations on the surface of an object, in accordance with an embodiment of the present application.

FIG. 5A presents a flowchart illustrating a method of a surface assessment system generating depth-enhanced images that highlight contaminations on the surface of an object, in accordance with an embodiment of the present application. During operation, the system receives one or more object images of an object (operation 502) and determines the viewpoint associated with a respective object image (operation 504). The system can select a viewpoint of the object from the determined viewpoints (operation 506). The system then generates the depth information and determines an input image for the selected viewpoint (operation 508). If the object image includes the depth information, the system can generate the depth information and an input image from the object image. Otherwise, the system can separately obtain the depth information.

The system then generates a highlighted image from the input image (operation 510) and combines the depth information with the highlighted image to generate an enhanced image (operation 512). The system then checks whether all viewpoints have been analyzed (operation 514). If all viewpoints have not been analyzed, the system continues to select a viewpoint of the object from the determined viewpoints (operation 506), and generate the depth information and an input image for the selected viewpoint (operation 508). If all viewpoints have been analyzed, the system stores the generated enhanced image(s) in a local storage device (operation 516).

Figure 5B:
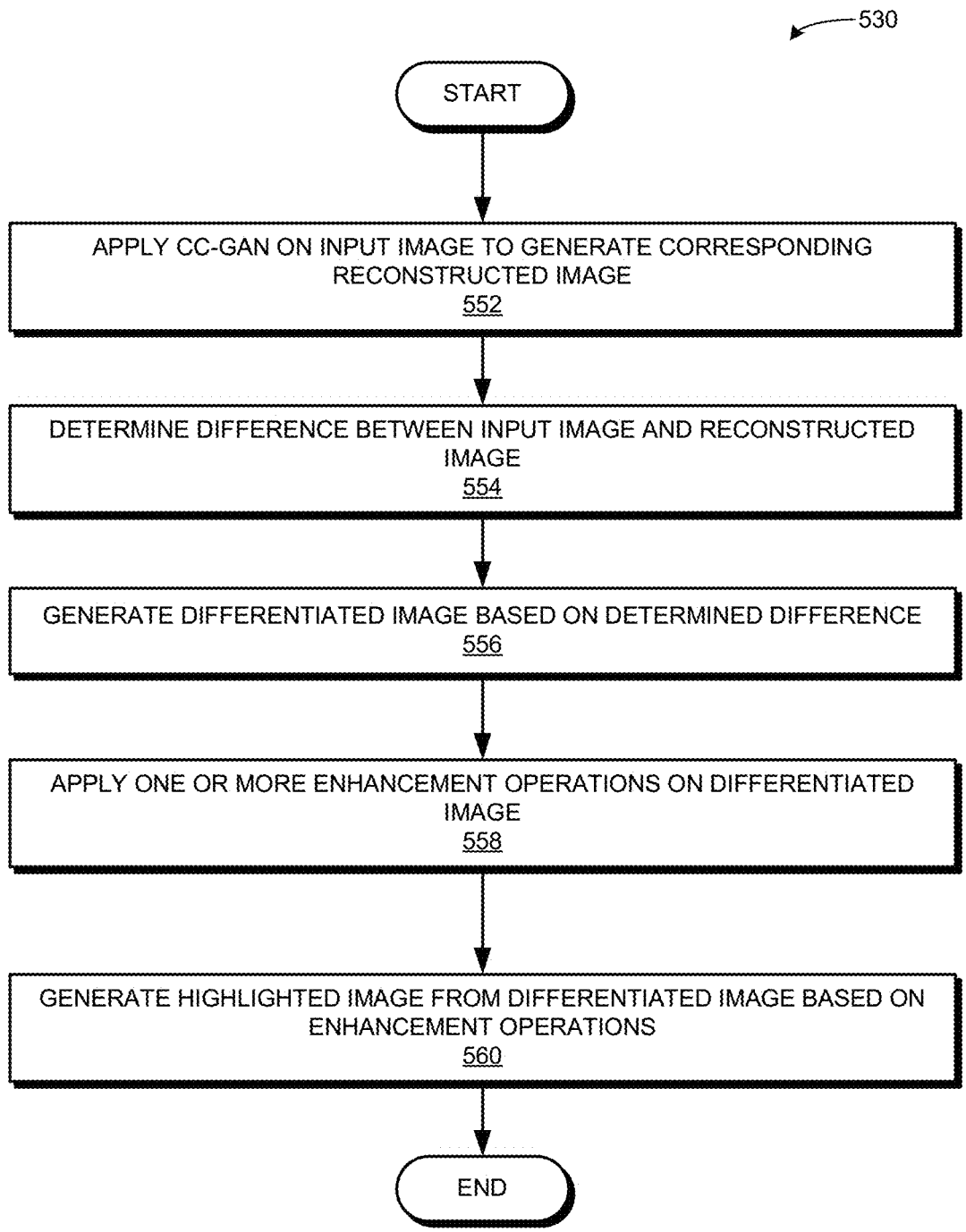
FIG. 5B presents a flowchart illustrating a method of a surface assessment system generating an image highlighting contaminations on the surface of an object, in accordance with an embodiment of the present application.

FIG. 5B presents a flowchart illustrating a method of a surface assessment system generating an image highlighting contaminations on the surface of an object, in accordance with an embodiment of the present application. During operation, the system applies a CC-GAN to an input image to generate a corresponding reconstructed image (operation 552). The system then determines a difference (e.g., a pixel difference) between the input image and the reconstructed image (operation 554). Subsequently, the system generates a differentiated image based on the determined difference (operation 556), and applies one or more enhancement operations, such as dilation, smoothing, and thresholding, on the differentiated image (operation 558). The enhancement operations can also be based on a deep segmentation network that can identify the contaminated regions on the differentiated image. The system then generates a highlighted image from the differentiated image based on the enhancement operation 560).

Figure 6:
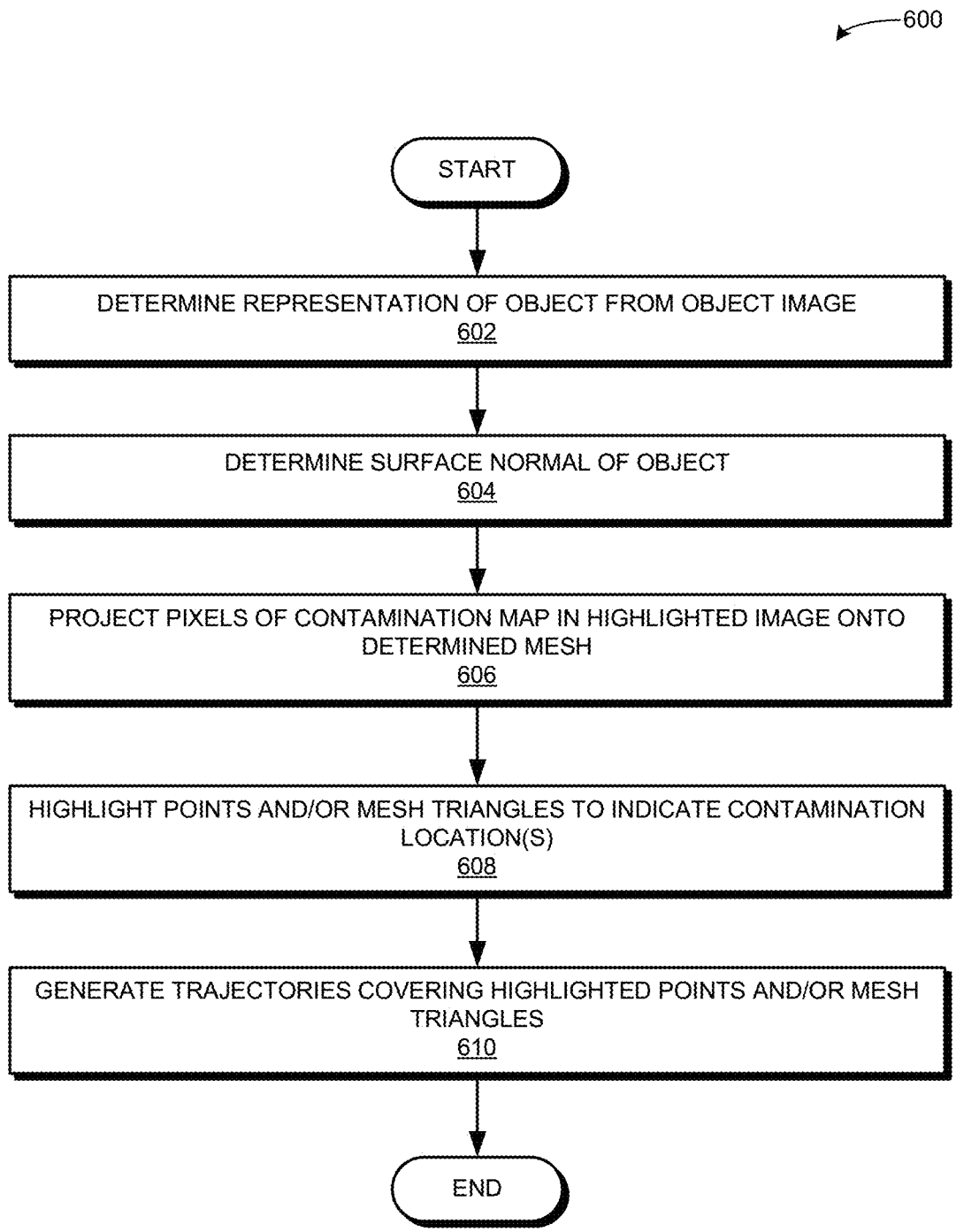
FIG. 6 presents a flowchart illustrating a method of a surface assessment system generating trajectories for a decontamination appliance based on the depth information of an object, in accordance with an embodiment of the present application.

FIG. 6 presents a flowchart illustrating a method of a surface assessment system generating trajectories for a decontamination appliance based on the depth information of an object, in accordance with an embodiment of the present application. During operation, the system determines a representation of an object (e.g., a mesh representation or a voxel representation) from an object image (operation 602) and determines a surface normal of the object (operation 604). The system then projects the pixels of the contamination map in a highlighted image of the object onto the determined mesh (operation 606). Subsequently, the system highlights the points and/or mesh triangles to indicate the contamination location(s) (operation 608). The system then generates trajectories covering the highlighted points and/or mesh triangles (operation 610).

Exemplary Computer System and Apparatus

Figure 7:
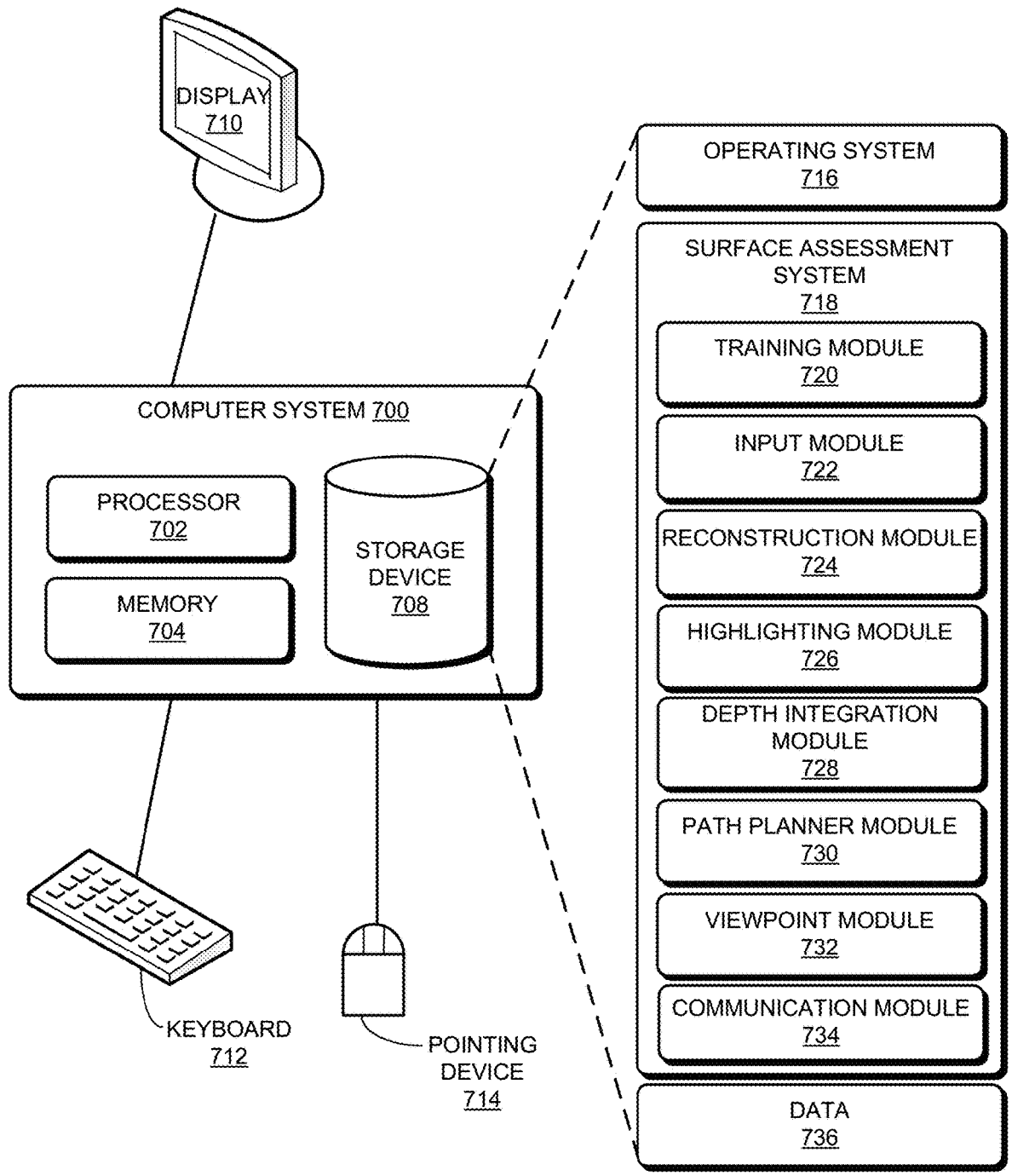
FIG. 7 illustrates an exemplary computer system that facilitates a surface assessment system, in accordance with an embodiment of the present application.

FIG. 7 illustrates an exemplary computer system that facilitates a surface assessment system, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a surface assessment system 718, and data 736. Surface assessment system 718 can incorporate the operations of system 120.

Surface assessment system 718 can include instructions, which when executed by computer system 700 can cause computer system 700 to perform methods and/or processes described in this disclosure. Specifically, surface assessment system 718 can include instructions for training a CC-GAN of surface assessment system 718 (training module 720). Surface assessment system 718 can also include instructions for generating input images and/or depth information (e.g., from object images) of an object (input module 722). Furthermore, surface assessment system 718 includes instructions for generating a reconstructed image (e.g., using the CC-GAN) (reconstruction module 724).

In addition, surface assessment system 718 includes instructions for generating a differentiated image and a corresponding highlighted image based on the input image and the reconstructed image (highlighting module 726). Surface assessment system 718 can also include instructions for incorporating depth information with the highlighted image and generating an enhanced image (depth integration module 728). Surface assessment system 718 may further include instructions for generating a set of trajectories from the enhanced image (path planner module 730). Surface assessment system 718 can also include instructions for covering different viewpoints of the object (viewpoint module 732). In addition, surface assessment system 718 can include instructions for sending and receiving messages (communication module 734).

Data 736 can include any data that can facilitate the operations of system 120. Data 736 may include one or more of: image samples, object images, input images, depth information, differentiated images, highlighted images, enhanced images, and trajectories.

Figure 8:
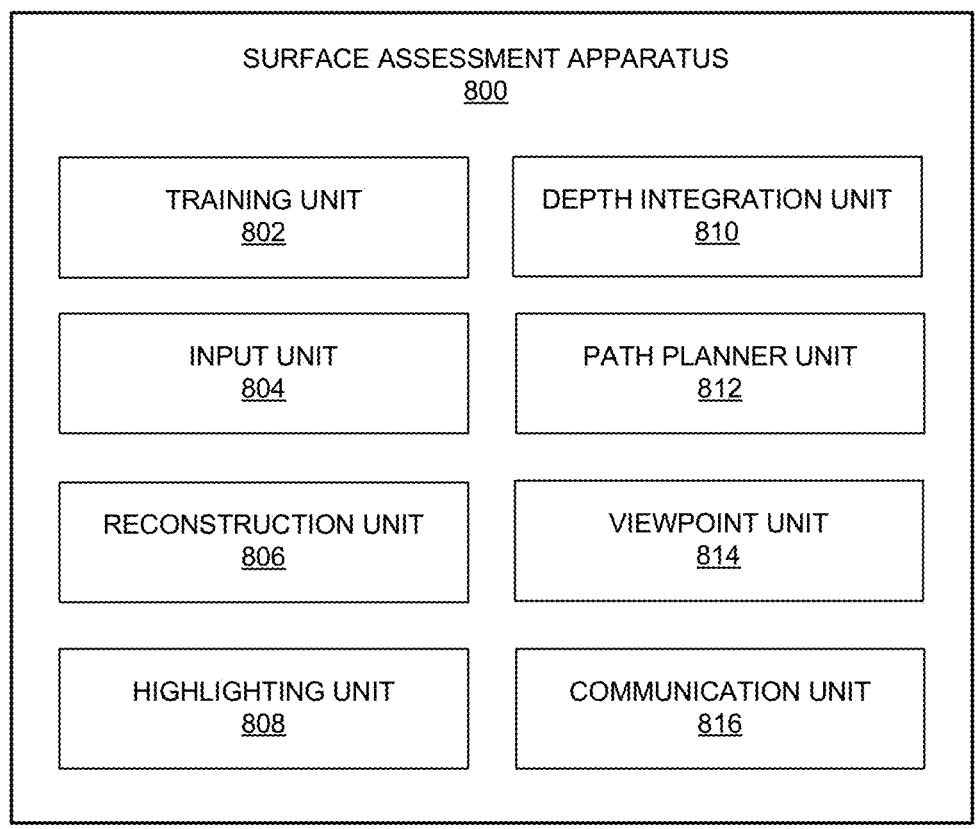
FIG. 8 illustrates an exemplary apparatus that facilitates a surface assessment system, in accordance with an embodiment of the present application.

FIG. 8 illustrates an exemplary apparatus that facilitates a surface assessment system, in accordance with an embodiment of the present application. Surface assessment apparatus 800 can comprise a plurality of units or apparatuses which may communicate with one another via a wired, wireless, quantum light, or electrical communication channel. Apparatus 800 may be realized using one or more integrated circuits and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-816, which perform functions or operations similar to modules 720-724 of computer system 700 of FIG. 7, including: a training unit 802; an input unit 804; a reconstruction unit 806; a highlighting unit 808; a depth integration unit 810; a path planner unit 812; a viewpoint unit 814; and a communication unit 816.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for assessing surface of an object for detecting contamination, comprising:
  obtaining an input image indicating the contamination on the object;
  determining depth information associated with the input image;
  generating a synthetic image using an artificial intelligence (AI) model based on the input image, wherein the synthetic image indicates the object without the contamination;
  determining a difference between the input image and the synthetic image to identify an image area corresponding to the contamination;
  generating a contamination map of the contamination by highlighting the image area based on one or more image enhancement operations; and
  incorporating the depth information with the contamination map to generate an enhanced contamination map.

2. The method of claim 1, wherein the AI model includes a cycle-consistent generative adversarial network (CC-GAN).

3. The method of claim 2, wherein the CC-GAN is trained with two sets of image samples, wherein a first of the two sets of image samples includes images of the object with contamination and a second of the two sets of image samples includes images of the object without contamination, and wherein the contamination indicated in the input image is absent in the two sets of image samples.

4. The method of claim 1, wherein the difference between the input image and the synthetic image is a pixel difference in one or more of: a Red-Green-Blue (RGB) space; a hue, saturation, lightness (HSL) space; and a hue, saturation, value (HSV) space.

5. The method of claim 1, wherein the image enhancement operations include one or more of: dilation, smoothing, thresholding, and a set of operations associated with a deep segmentation network.

6. The method of claim 1, further comprising generating a set of trajectories of a decontamination appliance based on the enhanced contamination map, wherein a respective trajectory cover contamination location on the object at a depth corresponding to the trajectory.

7. The method of claim 1, wherein incorporating the depth information comprises:
  determining a mesh representing the geometry of the object based on the depth information; and
  projecting contamination regions indicated in the contamination map onto corresponding locations in the mesh.

8. The method of claim 1, further comprising generating a set of contamination maps for the object, wherein a respective contamination map indicate a viewpoint of the object.

9. The method of claim 1, wherein generating the contamination map comprises excluding a background of the input image and non-contaminated elements of the object.

10. A non-transitory computer-readable storage medium storing instructions that when executed by a computer cause the computer to perform a method for assessing surface of an object for detecting contamination, the method comprising:

obtaining an input image indicating the contamination on the object;

determining depth information associated with the input image;

generating a synthetic image using an artificial intelligence (AI) model based on the input image, wherein the synthetic image indicates the object without the contamination;

determining a difference between the input image and the synthetic image to identify an image area corresponding to the contamination;

generating a contamination map of the contamination by highlighting the image area based on one or more image enhancement operations; and incorporating the depth information with the contamination map to generate an enhanced contamination map.

11. The computer-readable storage medium of claim 10, wherein the AI model includes a cycle-consistent generative adversarial network (CC-GAN).

12. The computer-readable storage medium of claim 11, wherein the CC-GAN is trained with two sets of image samples, wherein a first of the two sets of image samples includes images of the object with contamination and a second of the two sets of image samples includes images of the object without contamination, and wherein the contamination indicated in the input image is absent in the two sets of image samples.

13. The computer-readable storage medium of claim 10, wherein the difference between the input image and the synthetic image is a pixel difference in one or more of: a Red-Green-Blue (RGB) space; a hue, saturation, lightness (HSL) space; and a hue, saturation, value (HSV) space.

14. The computer-readable storage medium of claim 10, wherein the image enhancement operations include one or more of: dilation, smoothing, thresholding, and a set of operations associated with a deep segmentation network.

15. The computer-readable storage medium of claim 10, wherein the method further comprises generating a set of trajectories of a decontamination appliance based on the enhanced contamination map, wherein a respective trajectory cover contamination location on the object at a depth corresponding to the trajectory.

16. The computer-readable storage medium of claim 10, wherein incorporating the depth information comprises:

determining a mesh representing the geometry of the object based on the depth information; and projecting contamination regions indicated in the contamination map onto corresponding locations in the mesh.

17. The computer-readable storage medium of claim 10, wherein the method further comprises generating a set of contamination maps for the object, wherein a respective contamination map indicate a viewpoint of the object.

18. The computer-readable storage medium of claim 10, wherein generating the contamination map comprises excluding a background of the input image and non-contaminated elements of the object.

* * * * *